N. WYLLYS.
DRAWING REGULATOR FOR SPINNING.
No. 1726
Reissued July 12, 1864
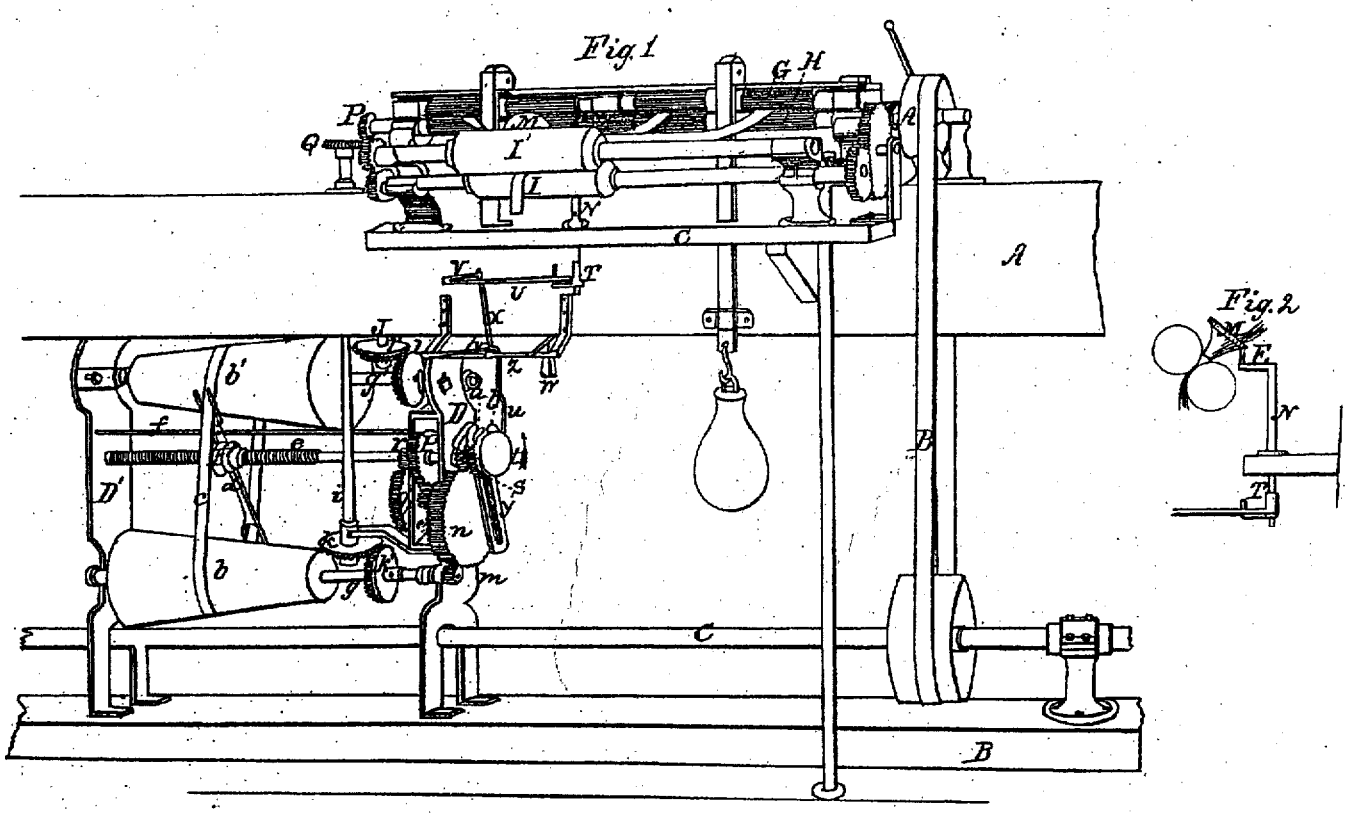

UNITED STATES PATENT OFFICE.

E. D. DRAPER AND GEORGE DRAPER, OF MILFORD, MASSACHUSETTS, ASSIGNEES, BY MESNE ASSIGNMENTS, OF NEWELL WYLLYS.

IMPROVEMENT IN DRAWING-REGULATORS FOR SPINNING-MACHINES.

Specification forming part of Letters Patent No. 7,919, dated January 28, 1851; Reissue No. 1,726, dated July 12, 1864.

*To all whom it may concern:*

Be it known that NEWELL WYLLYS, of Glastenbury, in the county of Hartford and State of Connecticut, invented a new and useful Improvement in Mechanism for Regulating the Speed of Drawing-Rollers by the Size of the Sliver; and we do hereby declare that the following is a full, clear, and exact description of the said invention, reference being had to the accompanying drawings, which form part of this specification, and in which—

Figure 1 represents a view in perspective of the improved drawing-regulator and of the parts of the drawing-frame with which it is connected, and Fig. 2 is a vertical section through the calender-rollers. Fig. 3 is a top view of the drawing-rollers, the trumpet, and calender-rollers, and the operative mechanism on the top of the frame of the machine. Fig. 4 is a top view, Fig. 5 a side elevation, Fig. 6 a front elevation, and Fig. 7 a vertical section, of the escapement mechanism, to be hereinafter described. Fig. 8 is an inner side view, and Fig. 9 is a top view, of the escapement-disk.

Experience has demonstrated that in those drawing-heads in which the drawing of the sliver is regulated by the size of the sliver itself the relative speeds of the several pairs of rollers by which the drawing is effected should not be changed with too great facility by slight and short inequalities in the size of the sliver, because the tendency of this over-sensitiveness is to cause an almost incessant variation in the speeds of the drawing-rollers, and to produce an irregular sliver composed of a series of alternate swells and contractions. In order to obviate this defect, and at the same time to insure a sufficient degree of sensitiveness in the mechanism for regulating the draw or draft so as to produce a sliver of uniform size, is the object of this invention.

By such invention, and particularly by my arrangement of the trumpet-carrier with respect to the calender and draft rollers, the trumpet, when the sliver is of a proper size, will be caused to occupy a certain neutral position, in which the force exerted by the weight to move the trumpet in one direction and that exerted by the sliver to move it in the opposite direction will balance each other, and whenever the sliver may be too thick, the force of the sliver on the trumpet will preponderate and the trumpet will be moved in advance of its neutral position, the effective length of leverage through which it acts will be diminished, and the weight will tend to return the trumpet to its neutral position with correspondingly increased force. Whenever the sliver may be drawn too thin or small the force of the weight will preponderate over that exerted by the sliver, the trumpet will be moved back of its neutral position, the effective length of the leverage through which it acts will be increased, and consequently the tendency of the sliver will be to return the trumpet to its neutral position with a correspondingly increased force.

In the accompanying drawings, A′ is the roller-beam of the drawing-frame on which the drawing-rolls are mounted, H H′ being the bottom or fluted rollers, and G G the top rollers. The shaft of the foremost or fastest-running bottom roller is fitted with a loose and a fast pulley, A, to either of which motion may be imparted by means of an endless belt, B′, extending from a pulley, X′, affixed concentrically on a counter-shaft, C. In front of the roller-beam A′ is the calender roll-board C, over which the calender-rollers I I′ are mounted. Motion is imparted to the lower of these calender-rollers from the shaft of the bottom drawing-roller, through the intervention of three cog-wheels, $a^2$ $b^2$ $c^2$. The upper calender-roller is put in motion through the intervention or by means of a pair of pinions, $d^2$ $e^2$, which are secured to the respective shafts of the calender-rollers.

The two rearmost drawing-rollers are driven from the shaft of the bottom roller, H, of the front pair in the following manner: An upright shaft, *i*, is supported in suitable boxes on the drawing-frame, and is furnished at each extremity with a beveled wheel. One of the said beveled wheels—viz., Q—at the upper end or part of the shaft gears into a beveled pinion, P, affixed on the shaft of the front bottom drawing-roller, H. The beveled wheel *k* at the lower extremity of the shaft *i* gears into a beveled wheel, *k′*, fixed on a horizontal shaft, *g*, whose journal-boxes are supported by standards D D′, which extend from the foot-beam B to the roller-beam A′ of the drawing-frame.

A second horizontal shaft, $g'$, supported in suitable boxes, is arranged above the first one, $g$, and the two are fitted with reversed-cone pulleys $b$ $b'$, encompassed by an endless belt, $c$. The second shaft, $g'$, is also fitted with a beveled wheel, $l$, which gears into a similar one, $l'$, fixed on the lower end of an upright shaft, $j$, and which shaft carries a beveled pinion, $f'$, which gears into a beveled wheel, $f^2$, fixed on the shaft of the rearmost bottom drawing-roller. The intermediate drawing-rolls may be driven from the rear pair through the intervention of cog-wheels secured to their respective shafts. This whole system of wheels, shafts, belt, and cone-pulleys is such that while the front bottom drawing-roller, H, may be revolving, it will put in revolution the cone-pulley $b$. This pulley acting upon the belt $c$ will drive the other cone-pulley, $b'$, which, through the intervention of the upright shaft $j$, will put in revolution the rearmost drawing-roller. As the pulleys are reversed cones, the shifting of the belt $c$ along them will cause the driven pulley $b'$ to revolve faster or slower than the driving-pulley $b$, and consequently the rearmost bottom drawing-roller will be driven faster or slower as the belt may be shifted in one direction or the other on the cone-pulleys. Should the said roller revolve faster while the speed of the front rolls is unchanged, the sliver will be less drawn between the rollers and will be delivered from the front rollers thicker than before the change of speed, while should the belt be shifted in order to cause the rear rolls to revolve slower than the front rolls, the sliver will be more drawn out and will be delivered thinner than before the change of speed.

In order to effect the shifting of the belt $c$ by a variation of the size of the united slivers passing through the trumpet M, the latter is pivoted to the outer extremity of an arm, E, which projects horizontally from a short upright shaft, T, supported in a tubular stand, N, and fitted at its lower extremity with a second arm, U. The latter—viz., the arm U—is connected by a rod, $v$, with an arm, $x$, projected upward from a horizontal shaft, 2, to which a second arm, $v'$, is fitted, whose outer extremity is connected by a rod, $u$, with an escapement-disk, $t$, by means of a joint-pin projecting from the outer side of such disk. This disk is to turn freely upon a screw, $e^4$, which is also fitted in a secondary shaft, $a^3$, on which a toothed wheel, $s$, is secured, whose teeth are acted upon by a pair of reversed pawls, $a$ $b$. The shaft $a^3$ carries a cog-wheel, $p$, which gears into a pinion, $o$, on a short counter-shaft, which is fitted with a cog-wheel, $q$, which gears into a pinion, $r$, secured to the shaft of the screw $e$. As the shaft $a^3$ may be turned in one direction or the other, the screw $e$ will be turned through the intervention of the train of gears in the same direction, but with a faster speed. The pawls $a$ $b$ are hinged to the upper part of a slotted lever, $y$, which, being hung loosely and so as to be capable of swinging upon the shaft $a^3$, will be caused to vibrate incessantly by a crank-pin, $p^4$, projected from a cog-wheel, $n$, and into the slot of such lever, motion being imparted to such wheel $n$ by a pinion, $m$, on the shaft $g$. The periphery of the disk is made with a flange which is equal in diameter to and is even with the circumference of the wheel $s$, and is perforated at its opposite sides with slots $s^4$ $s^5$, which are at such distances apart that when the disk is in such a position that the upper extremities of the slots are at equal distances on each side of a vertical plane passing through the axis of the shaft of the screw $e$, the lower ends of both the pawls will be supported on the solid portion or flange of the periphery of the disk which is between the two slots. When the disk may be turned, by the rod $u$, in the direction indicated by the arrow in Fig. 1 of the drawings, the solid portion of the flange between the two slots will be moved forward, the rearmost slot will be raised, and the rearmost pawl, $b$, will fall through the slot and engage with the teeth of the wheel $s$, and, being impelled by the lever $y$, will turn the said wheel $s$ in one direction. When the disk may be so moved as to raise the rear pawl out of engagement with the pinion or gear S, and allow the front pawl, $a$, to drop into gear with the said wheel $s$, the shaft $a^3$, to which such wheel is secured, and the screw $e$ will be turned in the opposite direction. The disk, therefore, in accordance with the position which its flange may assume, will act as an escapement either to keep the screw at rest or to allow it to be turned in either direction. The screw $e$ is fitted with a box or screw nut, F, provided with a double-forked bar, $d$, or forks to embrace the belt $c$, in manner as shown in Fig. 1. As the said box F may be moved along by the screw $e$ while in rotation, the belt will be shifted in its position upon the cone-pulleys, and consequently will cause the driven one and the rearmost drawing-rollers connected therewith to revolve at a speed different from that at which they moved before the screw was turned. When the disk $t$ is in a central position, both pawls will be out of gear with the toothed wheel $s$, and hence the belt will be retained in its position on the coned pulleys.

As the position of the disk will be governed by that of the trumpet M, with which it is connected by the system of devices above described, it follows that any movement of the trumpet from its mean position will be followed by a variation in the position of the belt $c$, and consequently by a variation in the speed of the rearmost drawing-rolls.

The sliver opening or passage through the trumpet should be of such size that when the united slivers are of the proper size the friction exerted by them in passing forward through the opening shall be just sufficient to maintain the trumpet in a mean position, notwithstanding the force exerted by a weight, W, to move the trumpet backward. Should, therefore, the united slivers passing through the trumpet be too large or thick, their friction in the trumpet will be increased, and the trumpet will be moved toward the calender-rolls. The escapement-disk *t*, being correspondingly moved, will allow the front pawl to act on the gear S, in which case the screw *e* will be revolved so as to effect the moving of the belt *c* toward the larger end of the driven cone *b'*, by which operation the speed of the rearmost drawing-rolls will be diminished, the separate slivers will be drawn thinner, and consequently the whole, when united, will be smaller, and will pass more easily through the trumpet, which will then be returned to its mean position by means of the weight W, and at the same time will move the escapement-disk correspondingly, in order to throw the pawls out of gear with the wheel *s*. Should, however, the united slivers be too small, the friction exerted upon the trumpet will be too little to maintain it in its mean position, especially under the action of the weight W; consequently the trumpet will be moved toward the drawing-rollers. The escapement-disk, being correspondingly moved, will allow the rear pawl to act, and the screw will be turned to shift the belt toward the smaller end of the driven cone, by which means the rearmost drawing-rolls will be driven faster, the separate slivers will be less drawn, and the size of the whole, when united, will be increased. Then the slivers will exert more friction in passing through the trumpet, which will therefore be restored to its mean position, and the further change of speed will be stopped, as the escapement-disk will also have arrived at its mean position, in which both pawls will be out of gear with the teeth of the wheel *s* of the sleeve.

It will be perceived that any knot or hard lump, while passing through the trumpet, will change the position of the latter only for a moment and not long enough to affect the speed of the drawing-rolls. This property of my apparatus is one cause of its superiority over those previously constructed, which, in such an event, would increase the speed of the back rollers so materially that the sliver would be diminished in size for some distance after the knot had passed the trumpet. It will be perceived, also, that as the trumpet is mounted upon an arm, E, projecting horizontally from a shaft, T, any change in the position of the trumpet will change the effective length of the lever or arm through which it acts. When this arm may be nearest to the drawing-rolls, the line passing through its axis will be nearly parallel with the drawing-rolls, and the effective length of the lever will be the greatest, while as the trumpet may move toward the calender-rolls its arm will be brought more nearly at right angles to its first position, in which case its effective length will be diminished. Hence it will follow that the nearer the trumpet may approach the calender-rolls the greater will be the power required to move it, and this arrangement will prevent those sudden alterations and vibrations of the trumpet and consequent incessant variations in the speed of the drawing-rollers for which self-regulating drawing-heads have heretofore been remarkable. This property of the said WYLLYS' invention is therefore of great value in practice, as the evenness of the sliver will be increased thereby.

We do not herein claim as the invention of the said WYLLYS a combination consisting not only of two separate mechanisms for revolving two sets of drawing-rollers, but of a mechanism by which, and by the draft of one or more slivers through a trumpet or its equivalent, the speed of one set of the drawing-rollers may be varied with respect to that of the others in order to produce uniformity in the draft of the sliver or slivers, such a combination being represented and described in the drawings and specification of Letters Patent granted to Whiting Hayden on March 12, A. D. 1850.

In carrying out his (the said WYLLYS) invention he has modified it, or combined with it, one or more elements or mechanism, or has introduced into it an escapement mechanism for the purpose of remedying or overcoming certain serious defects or irregularities in the operation of such combination, when made as represented in such patent.

With the said WYLLYS' invention he dispenses with the gears H I, the pinion G, and the arms E F, connected with and operated by the lever D of the trumpet, and by the shaft F, as represented in the specification and drawings of the patent of the said Hayden, such mechanism of the said Hayden requiring the pinion G thereof to be moved and held into gear with one of the gears I H by the draft of the sliver through the trumpet and with the other gear by the action of a weight exerted through the medium of a lever, D, and the arms E F.

With WYLLYS' improvement, the draft of the sliver through the trumpet and the weight tending to retract the trumpet have simply to perform the operations of moving the escapement-disk *t* in such manner as to either maintain both of the pawls *a b* out of action with the ratchet or gear S of the mechanism by which the screw-shaft *e* is revolved, or to keep one of the said pawls out of action with the said gear and allow the others to be in action with it.

When the trumpet of Hayden's machine is moved by the sliver or by the counter-weight, the moving pinion G will be thrown into gear with either of the cog-wheels I H, which, being stationary at the time of engagement, will, by its inertia, tend to repel the moving pinion, and more or less operate to hinder its engagement, the same operating to prevent or retard the proper action of the drawing-rollers on the sliver. The action of the gears produces unevenness in the sliver, or causes it to be reduced more in some than in other parts of it.

The momentum of the gears or parts in motion also has an injurious tendency, as it prevents the arresting of these motions quickly enough to prevent irregularity in the drawing of the slivers.

The improved mechanism of WYLLYS' operates differently, inasmuch as the differences in the size of the sliver have only to vary the position of the escapement-disk, whereby the pawls of the mechanism for rotating the screw *e* are controlled in their action in manner as hereinbefore described. This renders WYLLYS' mechanism very sensitive in its operation, and capable of causing the sliver to be drawn of a uniform size, practically considered.

What we claim as the invention of the said WYLLYS, and desire to secure by Letters Patent, is as follows:

1. The combination of the escapement-mechanism, or its mechanical equivalent, with the trumpet M, the counter-weight W, or its equivalent, and mechanism, substantially as described, for revolving the screw *e* of the belt-shipper and of the mechanisms by which the sets of drawing-rollers are revolved, the said escapement mechanism being connected with the trumpet and applied to the gear S, and consisting of the disk *t*, the pawls *a b*, the lever *y*, and its operative mechanism, substantially as hereinbefore explained.

2. The arrangement of the trumpet-arm E, as herein described, in connection with the system of weighted levers, the escapement, the belt-shifting mechanism, the reversed-cone pulleys, and the mechanism operated by them, whereby the force required to move the trumpet is made to vary under different circumstances to a sufficient extent to prevent oversensitiveness in the mechanism, which changes the relative speed of the drawing-rolls to inequalities in the slivers, while, at the same time, but little force is required to effect such changes, thus proportioning the draw more nearly than heretofore to the quantity of fiber in the sliver, and thereby rendering the latter of more uniform diameter and density.

In testimony whereof we have hereunto subscribed our names.

E. D. DRAPER.
GEORGE DRAPER.

Witnesses:
R. M. EDDY,
F. P. HALE, Jr.